United States Patent
Yamamoto et al.

(10) Patent No.: US 7,885,653 B2
(45) Date of Patent: Feb. 8, 2011

(54) FOLD MOBILE PHONE APPARATUS

(75) Inventors: Koichi Yamamoto, Yokohama (JP);
Hidehiro Yanagibashi, Kawasaki (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 10/476,392

(22) PCT Filed: Feb. 4, 2003

(86) PCT No.: PCT/JP03/01091

§ 371 (c)(1),
(2), (4) Date: Oct. 31, 2003

(87) PCT Pub. No.: WO03/067857

PCT Pub. Date: Aug. 14, 2003

(65) Prior Publication Data

US 2004/0132511 A1    Jul. 8, 2004

(30) Foreign Application Priority Data

Feb. 4, 2002    (JP)    .................... 2002-026479

(51) Int. Cl.
H04B 1/38    (2006.01)
H04M 1/00    (2006.01)
H04W 4/00    (2009.01)

(52) U.S. Cl. ................ 455/432.3; 455/90.3; 455/575.1; 455/575.2; 455/575.3; 455/575.4

(58) Field of Classification Search ............ 455/575.3, 455/90.3, 575.1, 575.2, 575.4, 432.3
See application file for complete search history.

(56) References Cited

U.S. PATENT DOCUMENTS

| 4,688,328 | A | * | 8/1987 | Jebens et al. | .................. 29/839 |
| 5,731,964 | A |   | 3/1998 | Kitakubo |   |
| 6,011,699 | A | * | 1/2000 | Murray et al. | .............. 361/814 |
| 6,364,696 | B1 |   | 4/2002 | Amazutsumi |   |
| 6,396,923 | B1 | * | 5/2002 | Kitamura et al. | ........ 379/433.01 |
| 6,625,030 | B1 | * | 9/2003 | Haixiong | .................... 361/737 |
| 6,708,046 | B1 | * | 3/2004 | Takagi | ....................... 455/575.3 |
| 6,754,507 | B2 | * | 6/2004 | Takagi | ....................... 455/550.1 |
| 6,763,245 | B1 |   | 7/2004 | Satoh |   |
| 6,876,875 | B2 | * | 4/2005 | Shimazaki et al. | ........ 455/575.1 |
| 6,941,117 | B2 | * | 9/2005 | Ide | ............................. 455/90.1 |
| 6,967,280 | B1 | * | 11/2005 | Boatwright et al. | ......... 174/377 |
| 7,414,855 | B1 | * | 8/2008 | Arnold | ........................ 361/752 |

(Continued)

FOREIGN PATENT DOCUMENTS

CN    1145573 A    3/1997

(Continued)

OTHER PUBLICATIONS

Japanese Office Action dated Dec. 20, 2005.

(Continued)

*Primary Examiner*—Matthew D Anderson
*Assistant Examiner*—Bobbak Safaipour
(74) *Attorney, Agent, or Firm*—Dickinson Wright PLLC

(57) ABSTRACT

The present invention has operating section 3, provided on an opposing plane of lower chassis 200 that faces upper chassis 100 when folded; circuit plane 7, provided inside lower chassis 200; and spacer 5, provided between operating section 3 and circuit plane 7 and supported by a rib.

3 Claims, 8 Drawing Sheets

U.S. PATENT DOCUMENTS

| | | | |
|---|---|---|---|
| 7,492,602 B2 * | 2/2009 | Kim et al. | 361/752 |
| 2002/0118826 A1 * | 8/2002 | Kiernan et al. | 379/433.09 |
| 2002/0119801 A1 * | 8/2002 | Nemoto et al. | 455/550 |
| 2003/0123232 A1 * | 7/2003 | Huang et al. | 361/751 |
| 2004/0203513 A1 * | 10/2004 | Kwon | 455/90.3 |
| 2004/0253972 A1 * | 12/2004 | Iwai et al. | 455/550.1 |

FOREIGN PATENT DOCUMENTS

| | | |
|---|---|---|
| EP | 0658030 | 6/1995 |
| JP | 04012589 | 1/1992 |
| JP | 06053880 | 2/1994 |
| JP | 07221823 | 8/1995 |
| JP | 07-283861 | 10/1995 |
| JP | 08153986 | 6/1996 |
| JP | 09-018555 | 1/1997 |
| JP | 10/032625 | 2/1998 |
| JP | 10-190803 | 7/1998 |
| JP | 10-215085 | 8/1998 |
| JP | 10276249 | 10/1998 |
| JP | 2000-041086 | 2/2000 |
| JP | 2000151136 | 5/2000 |
| JP | 2000-236378 | 8/2000 |
| JP | 2001-168540 | 6/2001 |
| JP | 2001-268812 | 9/2001 |
| JP | 2001-298516 | 10/2001 |
| JP | 2002-026479 | 1/2002 |

OTHER PUBLICATIONS

Japanese Office Action dated Aug. 15, 2006.
English Translation of Chinese Office Action dated Jun. 6, 2008.
Japanese Office Action dated Nov. 25, 2008.
Japanese Office Action for corresponding Japanese patent application dated Jul. 28, 2009.
PCT International Search Report dated May 27, 2003.

* cited by examiner

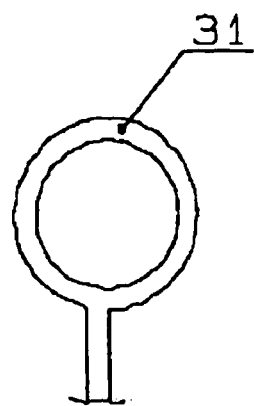
F I G. 7
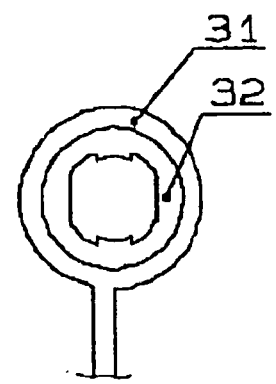
F I G. 8
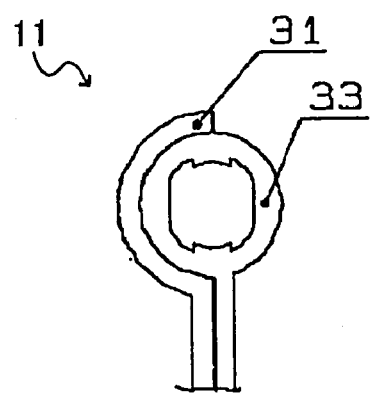
F I G. 9

FOLD MOBILE PHONE APPARATUS

TECHNICAL FIELD

The present invention relates to mobile phones, and more specifically, to fold mobile phone apparatus.

BACKGROUND ART

In recent years, small, thin, and fold-type mobile phone apparatus have become the majority. However, miniaturization and thin modeling has led to decreased mechanical strength and rigidity, and there have been many occurrences of damaging the installation parts. Especially, with the single-board that has key operating sections on the front plane and the installation parts on the rear plane, the stress from key pressing transmits directly to the installation parts, and there is a high likelihood of damaging the installation parts. Moreover, the configuration makes it difficult to take measures when the problem of damage arises. Furthermore, the spread of e-mail functions has led to the enlargement of main display sections and the mounting of sub display sections that can be used when the apparatus is closed, and as a result, the weight of the upper chassis of a fold mobile phone apparatus has increased, and the upper chassis and the lower chassis tend to have a poor weight balance.

FIG. 1 is a sectional diagram showing a part of a configuration of a conventional fold mobile phone apparatus. Control circuit 23 and radio circuit 24 are formed on the side of the opposite plane from the operating plane of key circuit board 25, and the installation parts of key circuit board 25, control circuit 23, and radio circuit 24 are supported by means of lower rear case rib 27 formed in lower rear case 8.

As to the operation of key pressing, when key sheet 3 is pressed in the direction of the arrow, the stress from the operating section side of key circuit board 25 transmits to the installation parts on the opposite plane side from the operating section side. Next, this stress is received in lower rear case rib 27 formed in lower rear case 8. Moreover, this stress is received in battery 9 attached to lower rear case 8. Especially, in case the edge portions of the installation parts are situated right underneath the keys, little force of key pressing causes substantial stress to the solder joint portion of the installation parts, and the likelihood of damaging the solder joint portion is high.

Moreover, conventional fold mobile phone apparatus have the installation parts on the side of the opposite plane from the operating side of a key circuit board, and the likelihood of damaging the installation parts by key pressing, bending, and twisting is high. Moreover, a further problem is that miniaturization and thin modeling make the likelihood even higher.

Furthermore, since parts are implemented on the opposite plane side from the operating section side of the key circuit board, when development to new models is considered, miniaturizing a circuit board along with miniaturization of installation parts naturally miniaturizes the operating part as well, thereby leading to the problem of poor operationality.

DISCLOSURE OF INVENTION

It is therefore an object of the present invention to provide a fold mobile phone apparatus that is small and thin yet strong and rigid.

The above object can be achieved by providing a flat spacer between an operating section and a circuit board and by receiving stress that results from key pressing operations, bending, and twisting of the operating section by the spacer.

BRIEF DESCRIPTION OF DRAWINGS

FIG. 7 is a sectional view, showing a configuration of a hinge section of a conventional fold mobile phone apparatus for comparison with the embodiment;

FIG. 8 is a sectional view, showing another configuration of a hinge section of a conventional fold mobile phone apparatus for comparison with the present embodiment;

FIG. 9 is a sectional view, showing a configuration of a hinge section of the fold mobile phone apparatus of the embodiment of the present embodiment;

BEST MODE FOR CARRYING OUT THE INVENTION

Embodiments of the present invention will be described now with reference to the accompanying drawings.

Figure 1:
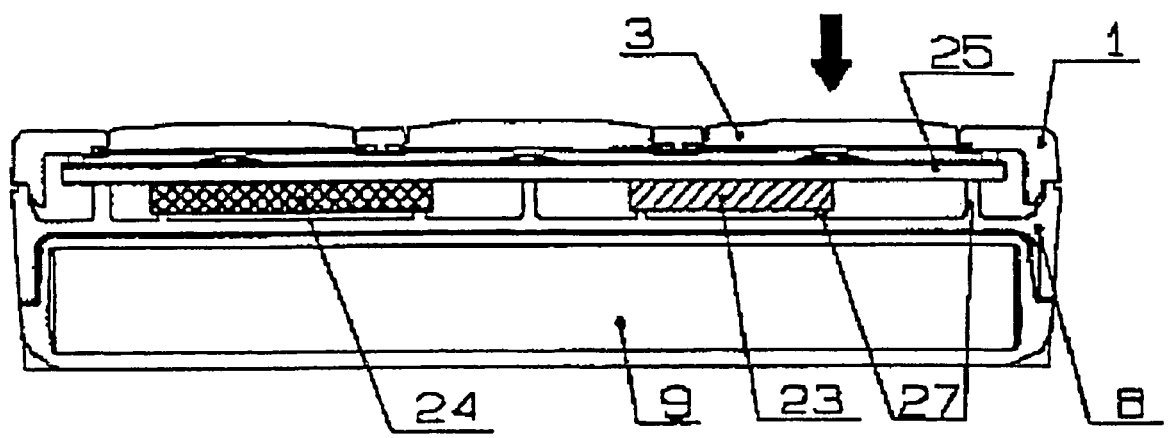
FIG. 1 is a sectional diagram, showing a configuration inside a lower chassis of a conventional fold mobile phone apparatus.
Figure 2:
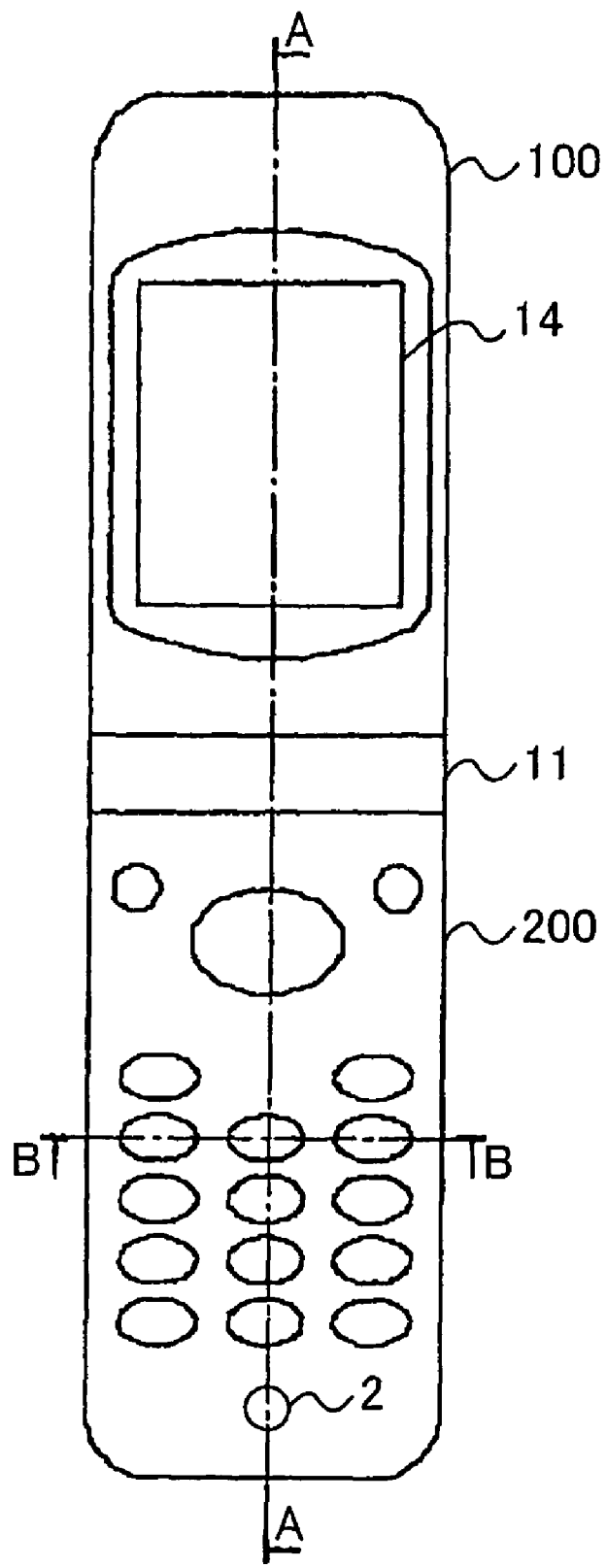
FIG. 2 is a front view diagram, showing an external view of a fold mobile phone apparatus according to an embodiment of the present invention.
Figure 3:
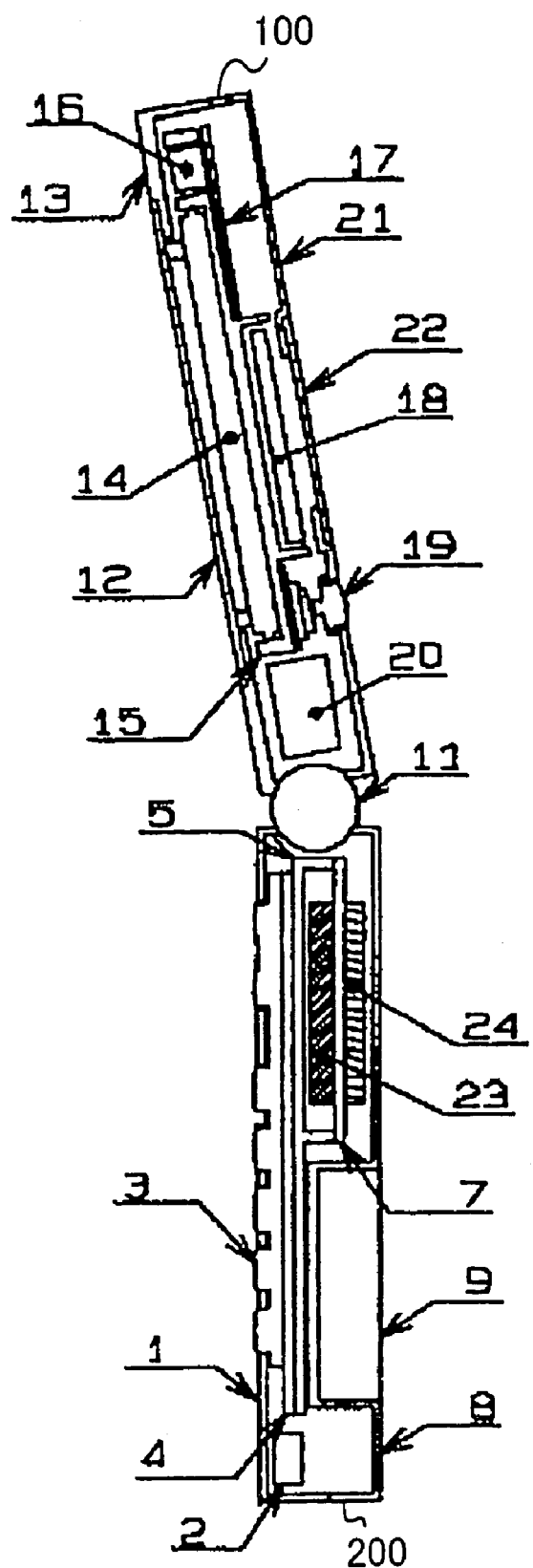
FIG. 3 shows an A-A sectional view of FIG. 2.
Figure 4:
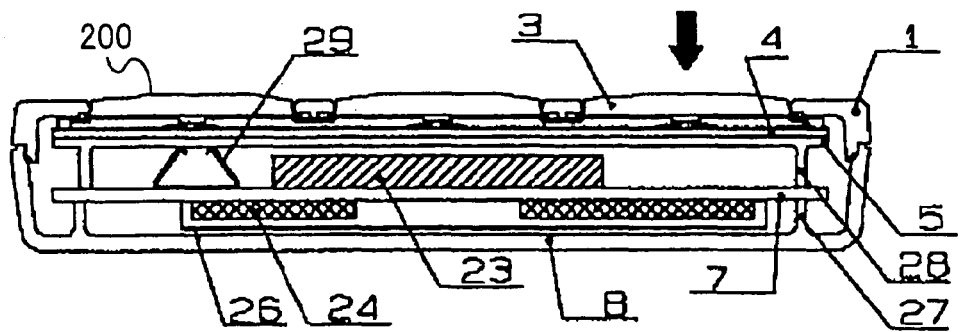
FIG. 4 shows a B-B sectional view of FIG. 2.
Figure 6:
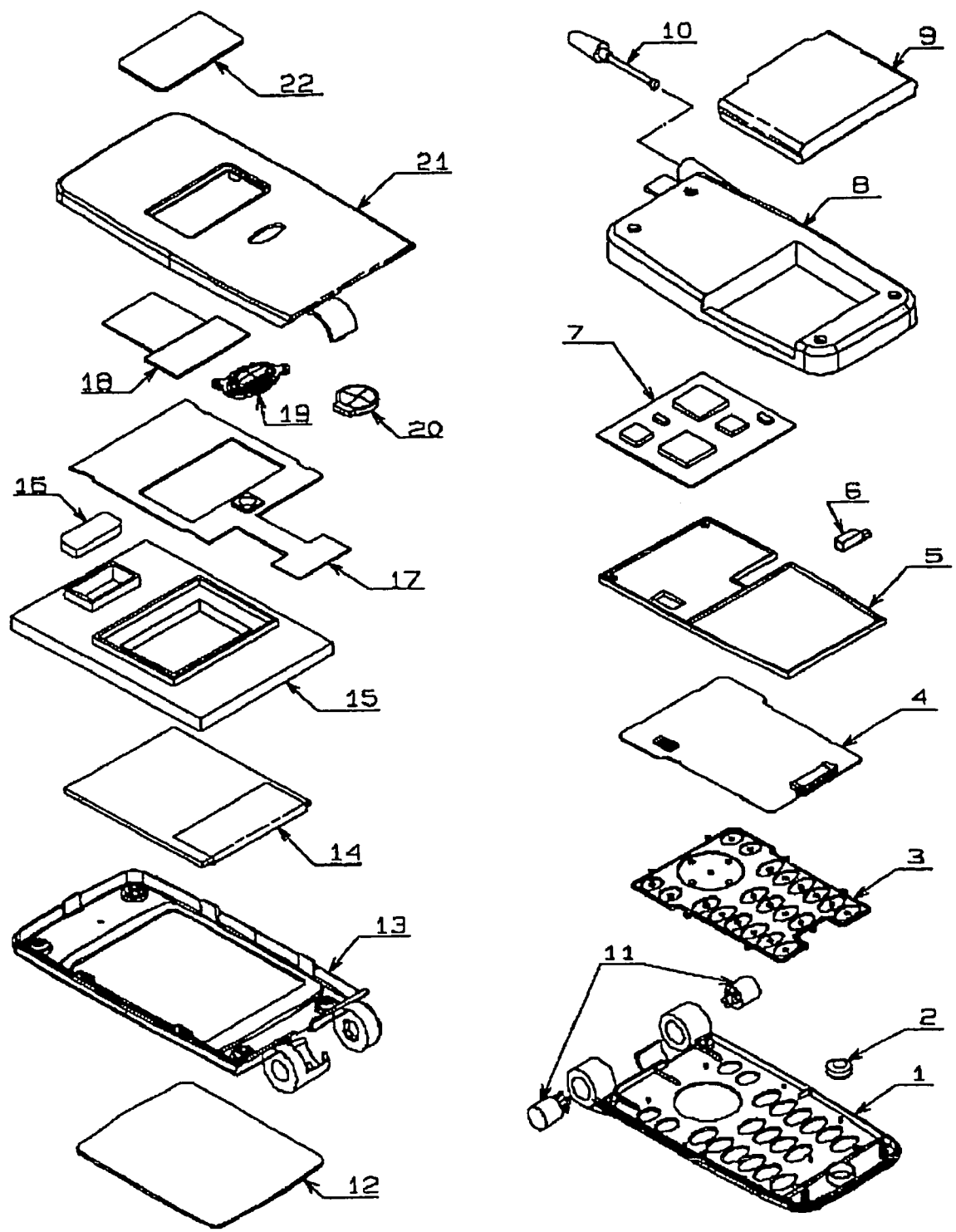
FIG. 6 is a decompositional perspective view, showing a configuration of the fold mobile phone apparatus of the embodiment of the present invention.

FIG. 2 is a front view diagram, showing an external view of a fold mobile phone apparatus according to one embodiment of the present invention; FIG. 3 shows an A-A sectional view of FIG. 2; FIG. 4 shows an B-B sectional view of FIG. 2; and FIG. 6 is a decompositional perspective view, showing a configuration of the fold mobile phone apparatus of the present embodiment of the present invention.

As shown in FIG. 2 and FIG. 3, the folding mobile phone apparatus of this embodiment comprises upper chassis 100 and lower chassis 200. Upper chassis 100 and lower chassis 200 are rotatably mounted via hinge section 11.

Upper chassis 100 is provided with main display section 14 and sub display section 18 for display sections. Main display 14 functions as a display section when the folding mobile phone apparatus is open, and sub display 18 functions as a display section when the folding mobile phone apparatus is closed. Main display 14 and sub display 18 are both electrically connected to flexible board 17 and held by means of holder 15.

Incidentally, sub display 18 has the functions of displaying the battery level, the signal condition, and the time, and displaying the number and the name of the caller upon an incoming call, thereby realizing a folding mobile phone apparatus that is highly convenient even while it is closed. Additionally, receiver 16 is also held by holder 15.

Upper chassis 100 is formed with upper front case 13 and upper rear case 21. Inside upper rear case 21, speaker 20 and rear key 19 are provided. Moreover, main display panel 12 is provided on upper front case 13 and sub display panel 22 is provided on upper rear case 21, there by protecting main display section 14 and sub display section 18. Rear key 19 is provided with the function of switching the display content on sub display section 18 while the folding mobile phone apparatus is closed, the function of recording the caller's voice while the folding mobile phone apparatus is open and a call is in progress, and the function of playing the recorded content.

On the other hand, lower chassis 200 is formed with lower front case 1 and lower rear case 8. Lower chassis 200 is provided with key sheet 3 and key board 4 as the operating section. No installation parts are mounted on the opposite plane side from the operating section of key board 4. Control circuit 23 and radio circuit 24 are formed on circuit board 7, and flat spacer 5 is provided between key board 4 and circuit board 7.

Radio circuit 24 is provided with shield case 26 to prevent the intrusion of electromagnetic waves and maintain electrical performance, and such conductive material as phosphor copper, beryllium copper, spring nickel silver, and spring stainless, or electroless-plated resin material is used.

Spacer 5 is provided with spacer rib 28 that protrudes in the direction of circuit board 7. Moreover, low rear case 8 is provided with lower rear case rib 27 that protrudes in the direction of circuit board 7. These spacer rib 28 and lower rear case rib 27 are formed in such positions that they face each other over circuit board 7. In this way, circuit board 7 is sandwiched between spacer rib 28 and lower rear case rib 27 and held parallel to key board 4. Moreover, spacer 5 is fixed by lower rear case 8.

Spacer 5 is formed of conductive magnesium, which, as in the case of radio circuit 24, makes it possible to prevent the intrusion of electromagnetic waves to control circuit 23 and maintain electrical performance. Incidentally, in case of insufficient electrical performance, by installing ground spring 29 made of such conductive material as phosphor copper, beryllium copper, spring nickel silver, and spring stainless on circuit board 7, and by pressing both spacer 5 and circuit board 7 against each other by the compression of ground spring 29, it is possible to strengthen the electrical connection and maintain more stable electrical performance.

Referring to circuit board 7, control circuit 23 is formed on the spacer side and radio circuit 24 is formed on the lower rear case 8 side, so that radio circuit 24, where the intrusion of electromagnetic waves is substantial, is covered with shield case 26, and control circuit 23, where the intrusion of electromagnetic waves is less compared to radio circuit 24, can utilize conductive spacer 5 as a shield case, thereby making it unnecessary to provide a dedicated shield case and thus realizing an ideal configuration.

If, on circuit board 7, control circuit 23 is formed on the lower rear case 8 side and radio circuit 24 is formed on the spacer 5 side, spacer 5 alone is insufficient for the measure against the intrusion of electromagnetic waves, and an additional shield case is necessary. Additionally, referring to control circuit 23, if lower rear case 8 is aluminum deposited in lower rear case 8 for the measure against the intrusion of electromagnetic waves, the likelihood of insufficient electrical performance, which makes it likely that an additional shield case needs to be provided. In other words, two shield cases are likely to be necessary, which then results in an increase in product cost and body size.

Lower chassis 200 is provided with additional components including battery 9, vibrator 6, antenna 10, and microphone 2, and these components are accommodated in lower front case 1 and in lower rear case 8.

As to the operation of key pressing, when key 3 is pressed in the direction of the arrow, the force from keyboard 4 first transmits to spacer 5. However, provided that spacer 5 is made of high rigid material such as magnesium, it is possible to reduce the stress from key board 4. Additionally, since no installation parts are provided on the plane of key board 4 opposite from the operating side, the stress of key pressing does not transmit to the installation parts. Although the stress that has transmitted to spacer 5 then transmits to circuit board 7, given the configuration in which lower rear case rib 27 formed on lower rear case 8 receives this stress and supports circuit board 7, it is still possible to reduce shape changes of circuit board 7 and stress upon the installation parts.

Figure 5:
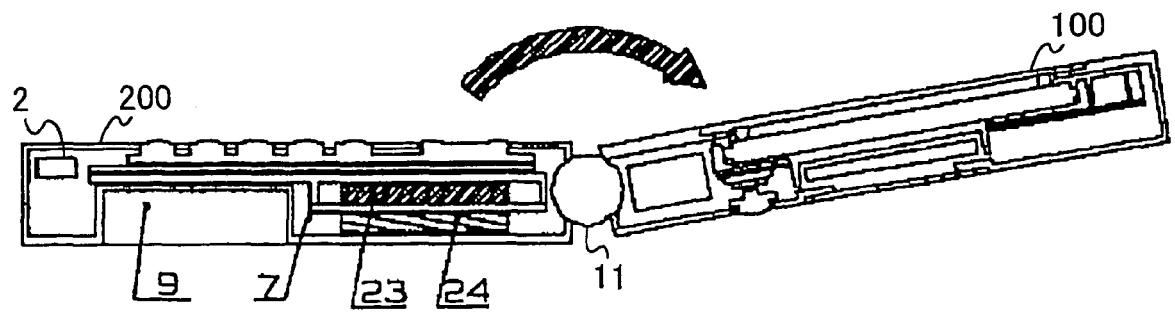
FIG. 5 is a sectional diagram, showing a configuration of the fold mobile phone apparatus of the embodiment of the present invention as laid on a desk.

FIG. 5 is a structural diagram showing the fold mobile phone apparatus of the present embodiment laid on a desk. When the fold mobile phone apparatus is used while laid on a desk or a table, by providing battery 9, which has the heaviest relative weight, at a position near microphone 2 apart from hinge section 11, the center of gravity of the body moves to a more remote position from hinge section 11, so that even when upper case 100 rotates in the direction of the arrow, it will not have a fall and remain stably set.

FIG. 7 is a sectional diagram, showing an example of the configuration of a hinge section of a conventional fold mobile phone apparatus, in which lower front case hinge section 31 is formed in lower front case 1. Usually, lower front case 1 is formed of magnesium material to improve the rigidity of the body. FIG. 8 is a sectional diagram, showing another configuration of a hinge section of a conventional fold mobile phone apparatus. Lower front case 1 is formed of general resin material such as ABS, and insert fitting 32, formed of metal system by insert molding, is provided in lower front case 1. In this case, the rigidity of the body is secured by insert fitting 32.

FIG. 9 is a sectional diagram showing a configuration of hinge section 11 of the fold mobile phone apparatus of the present embodiment of the present invention, and hinge section 33 is formed in spacer 5 made of metal material such as magnesium. By this means, it is possible to maintain the rigidity of the body and form lower front case 1 of general resin material such as ABS. In this way, it is not necessary to form the lower front case of magnesium, which is an external component, so that it is possible to improve the appearance and enhance manufacturability and costs.

Figure 10:
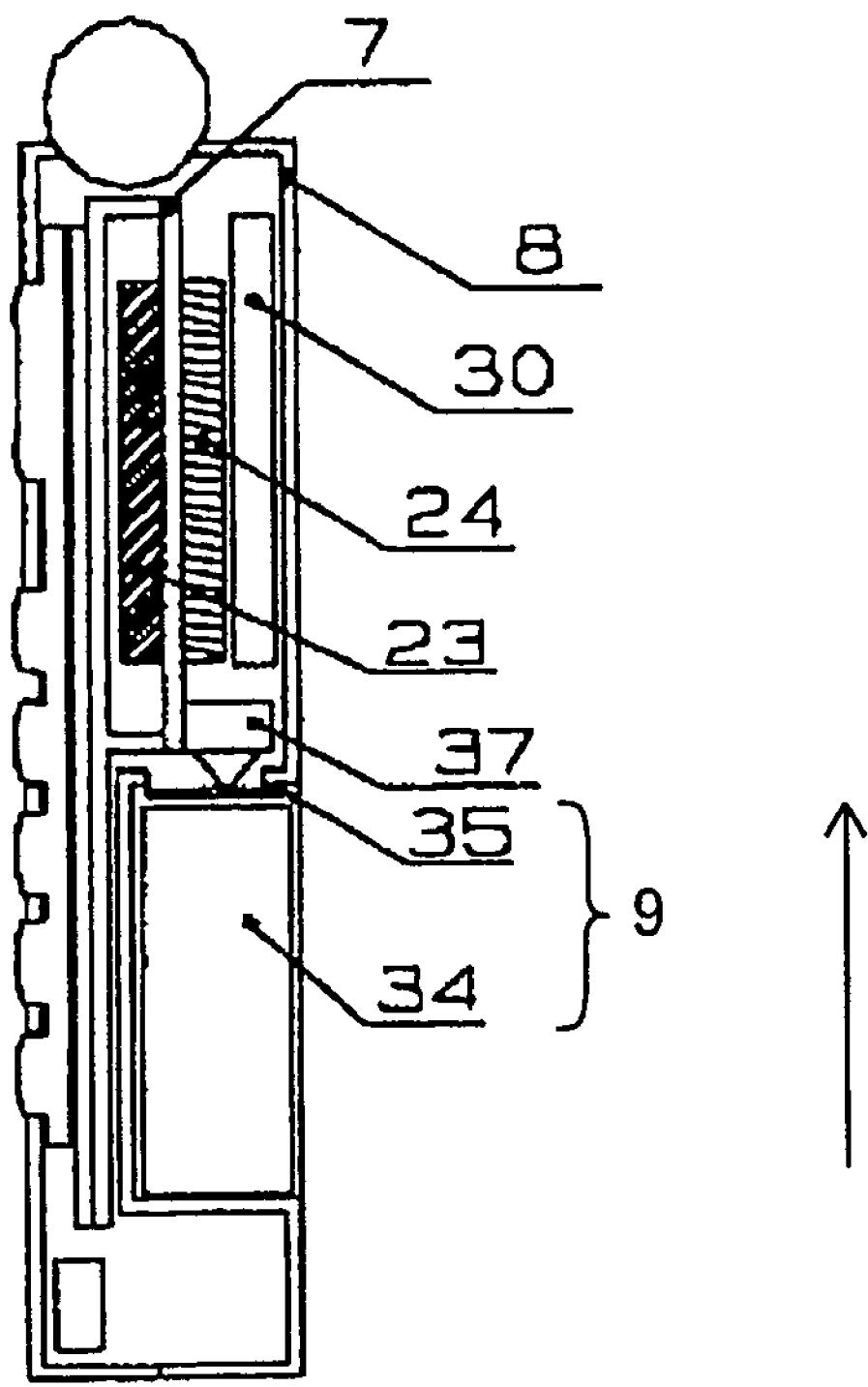
FIG. 10 is sectional view, showing a configuration inside the fold mobile phone apparatus according to another embodiment of the present embodiment.

FIG. 10 is a sectional diagram showing a configuration of a lower chassis of a fold mobile phone apparatus of another embodiment of the present invention. Recent years have seen the emergence of products such as mobile phone apparatus mounting media cards including SD cards, and the growth of current consumed due to high-functionalizations such as TV telephones and moving-image playback, and the term of battery tends to shorten. With fold mobile phone apparatus, considering the weight balance of an upper chassis and a lower chassis, an SD card should ideally be mounted in the lower chassis. Taking this into consideration, the mobile phone apparatus of the present embodiment retains the basic configuration of the above described embodiment, and SD card connector 30 is provided between lower rear case 8 and radio circuit section 24. As obvious from FIG. 10, key board 4 and circuit board 7 retain the basic configuration with little change, and so SD card connector 30 can be situated between circuit board 7 and lower rear case 8. Although the thickness of SD card connector is added to the body, this also thickens battery 9 as well so that a high-capacity battery can be used.

Next, a battery connector section for supplying power from battery 9 will be described. Battery 9 comprises battery cell 34 and battery protection circuit board 35. Horizontal battery connector 37 is mounted to circuit board 7. Horizontal battery connector 37 operates in horizontal directions with respect to circuit board 7 as shown in the figure by the arrow. Consequently, it is possible to situate battery protection circuit board 35, attached to horizontal battery connector 37 for electrical connection, parallel to the side plane of battery cell 34, that is, vertically.

Figure 11:
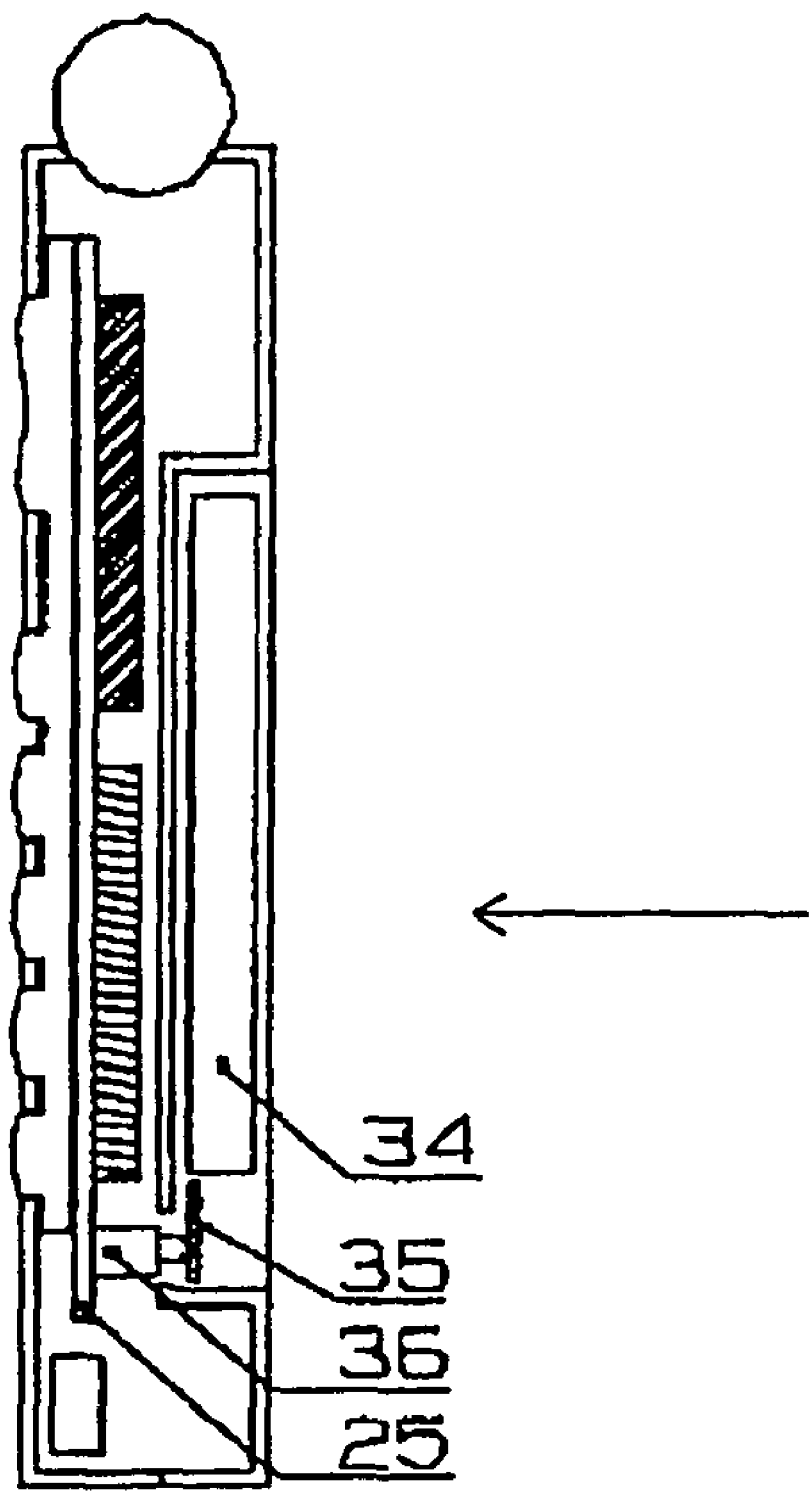
FIG. 11 is a sectional view, showing a configuration inside a lower chassis of a conventional fold mobile phone apparatus for comparison with the embodiment.

Next, FIG. 11 shows an example of a configuration of a lower chassis of a conventional fold mobile phone apparatus. Vertical battery connector 36 is mounted on the opposite side from the operating side of key circuit plane 25, and vertical battery connector 36 operates in vertical directions with respect to key circuit board 25 as shown in the figure by the arrow. Consequently, battery protection circuit board 35, attached to vertical battery connector 36 for electrical connection, can be situated longitudinally with respect to the side plane of battery cell 34, that is, horizontally, and naturally the battery becomes long in the length direction.

The present embodiment is by no means limited to the above described embodiments and various changes and modifications can be applied for implementation.

The mobile phone apparatus of the present invention adopts a configuration of a fold mobile phone apparatus comprising an upper chassis, having a display section, and a lower chassis, having an operating section, rotatably mounted via a hinge section, the apparatus comprising: an operating section, provided on an opposing plane of the lower chassis that opposes the upper chassis when folded; a circuit board, provided inside the lower chassis; and a spacer, flat and provided between the operating section and the circuit board and supported by means of a rib.

In this configuration, the stress from key pressing, bending, and twisting is supported by means of the flat spacer, so that it is possible to maintain a small and thin size and prevent damage to the circuit board and such.

The mobile phone apparatus of the present invention adopts a configuration of a fold mobile phone apparatus, wherein a battery is situated on a side of a circuit board seen from a spacer, and near a microphone, the microphone being in a position more remote from a hinge section than the circuit board.

In this configuration, in the lower chassis, the center of gravity becomes far from the hinge section, which improves the weight balance when held in hand, so that even a long call can be carried out without fatigue. Moreover, when the fold mobile phone apparatus has TV telephone functions and is used as laid on a desk or a table, the center of gravity becomes far from the hinge section, so that, without worry that the apparatus might tumble into the direction of the upper-situated upper chassis, a stable, fold mobile phone apparatus of a good weight balance can be obtained.

The mobile phone apparatus of the present invention adopts a configuration, wherein, on a circuit board, a control circuit is provided on a plane on a side of an operating section a radio circuit is provided on a plane of an opposite side of the operating section.

In this configuration, the control circuit is formed on the operating section side and the radio circuit is formed on the lower rear case side, so that the radio circuit, where the intrusion of electromagnetic waves is substantial, is covered with a shield case, and as to the control circuit, where the intrusion of electromagnetic waves is less than in the radio circuit, it can utilize the spacer, which is conductive, as a shield case, making it unnecessary to provide a dedicated shield case.

The mobile phone apparatus of the present invention adopts a configuration, wherein a spacer rib that protrudes in a direction of a circuit board is formed in a spacer and a rear case rib that protrudes in the direction of the circuit board is formed in a rear case of the lower chassis, the spacer rib and the rear case rib formed in opposing positions over the circuit board.

In this configuration, the stress on the spacer is supported by both the spacer rib and the lower rear case rib, so that it is possible to completely prevent damage to the circuit board and such.

The mobile phone apparatus of the present invention adopts a configuration, wherein a connector is installed on a circuit board, the connector supplying d power from a battery and attached to a side plane of the battery.

In this configuration, making the battery connector horizontal makes it possible to situate a battery protection circuit board vertically and shorten the length of the length direction of the battery, thereby further miniaturizing the fold mobile phone apparatus.

As described above, according to the present invention, by providing a flat spacer between an operating section circuit board, and by receiving the stress from key pressing operations of the operating section, bending, and twist, it is possible to realize a fold mobile phone apparatus that is small and thin yet strong and rigid.

Moreover, when new models are developed, it is relatively easy to make common basic configurations, and when a circuit board is miniaturized, the battery can be made longer that much and a high-capacity battery can be realized. Then, furthermore, there is no need to change the size of a key board, and it is possible to realize a key sheet of a handy size that takes operability into consideration and provide a highly convenient fold mobile phone apparatus.

Furthermore, considering the possibilities of further high-functionalizations such as the mounting of media cards, TV telephones, moving image playback, and music distribution, the relationship of a circuit board and a battery in the configuration enables effective use of space, which makes various developments possible.

The present invention relates to Japanese Patent Application No. 2002-26479 filed on Feb. 4, 2002, entire content of which is expressly incorporated herein by reference.

INDUSTRIAL APPLICABILITY

The present invention suits for use in fold mobile phone apparatus.

The invention claimed is:
1. A mobile telephone apparatus comprising:
a chassis that has a front case and a rear case positioned opposite to the front case, the front case and the rear case each having a surface extending in a longitudinal direction of the mobile telephone apparatus;
an operating section that is supported by the front case;
a circuit board including two generally flat opposing sides, said two generally flat opposing sides being generally parallel with at least one of said front case and said rear case;
a battery that is oriented such that geometric planes which include said two generally flat sides of the circuit board extend through the battery, the geometric planes being generally parallel with said surface of said at least one of said front ease and said rear case;
a spacer that is provided between the operating section and the circuit board and between the operating section and the battery;

a battery connector that is mounted on one of the two sides of the circuit board facing the rear case and that abuts on the battery;

a first circuit that is formed on the other of the two sides of the circuit board facing the front case; and a second circuit that is formed on the one side of the circuit board facing the rear case.

2. The mobile telephone apparatus according to claim 1, wherein the second circuit comprises a radio circuit.

3. The mobile telephone apparatus according to claim 1, wherein the battery connector operates in horizontal directions with respect to the one side of the circuit board.

* * * * *